US005142973A

United States Patent [19]

Tur et al.

[11] Patent Number: 5,142,973

[45] Date of Patent: Sep. 1, 1992

[54] ONION CUTTER

[76] Inventors: Anton Tur, 209 Old Canton Rd., Marietta, Ga. 30068; Milan Repisky, 9785 Loblolly La., Roswell, Ga. 30075; Nicholas M. Proia, Jonesboro, Ga. 30236

[21] Appl. No.: 831,174

[22] Filed: Feb. 5, 1992

Related U.S. Application Data

[63] Continuation-in-part of Ser. No. 667,644, Mar. 11, 1991.

[51] Int. Cl.[5] .................... A47J 17/00

[52] U.S. Cl. .................... 99/538; 83/588; 83/630; 99/537; 99/543; 99/545

[58] Field of Search .................... 99/537, 538, 542–545; 83/588, 630, 621, 145, 437, 451

[56] References Cited

U.S. PATENT DOCUMENTS

| | | | |
|---|---|---|---|
| 703,331 | 6/1902 | Acree | 99/545 |
| 951,241 | 3/1910 | Hampel | 83/630 |
| 2,560,229 | 7/1951 | Leavens | 99/537 |
| 2,625,972 | 1/1953 | Torres | 99/545 |
| 2,836,212 | 5/1958 | Shaw | 99/538 |
| 3,128,810 | 4/1964 | Whipp | 99/545 |
| 3,468,355 | 9/1969 | Hall | 99/537 |
| 4,095,518 | 6/1978 | Jones | 99/538 |
| 4,436,025 | 3/1984 | Jones | 99/538 |
| 4,559,856 | 12/1985 | Pettus | 83/630 |
| 4,569,280 | 2/1986 | D'Ambro et al. | 99/537 |

FOREIGN PATENT DOCUMENTS

| | | | |
|---|---|---|---|
| 817351 | 10/1951 | Fed. Rep. of Germany | 99/545 |
| 2307331 | 7/1974 | Fed. Rep. of Germany | 99/537 |
| 21823 | 7/1965 | Japan | 99/545 |
| 379705 | 8/1964 | Switzerland | 99/537 |

*Primary Examiner*—Timothy F. Simone

*Attorney, Agent, or Firm*—Hopkins & Thomas

[57] ABSTRACT

A food cutting apparatus for making multiple radial cuts in a work piece such as an onion has a cutter assembly formed as a truncated cone by a plurality of radially extending cutter blades. The cutter assembly cuts through the work piece until it encounters stops which prevent it from passing completely through the work piece. Ejector members are provided for separating the cutter assembly from the work piece after the cutting operation.

7 Claims, 3 Drawing Sheets

ONION CUTTER

RELATED APPLICATIONS

This application is a continuation-in-part of U.S. patent application Ser. No. 07/667,644, filed Mar. 11, 1991, pending.

FIELD OF THE INVENTION

This invention relates to the cutting of food prior to cooking, and, more particularly, to a method and an apparatus for preparing and cutting onions prior to frying.

BACKGROUND OF THE INVENTION

In the food processing industry, more particularly the restaurant industry, it is often necessary to cut or slice the foods, such as fruit, potatoes, or onions, into a number of pieces without crushing or mashing the food so that the pieces may be cooked or further processed individually, or may be presented as cut in a decorative or attractive manner.

The prior art is replete with various mechanical devices for cutting food into desired configured pieces for further processing or for facilitating eating. In U.S. Pat. No. 951,241 of Hampel there is shown an apparatus for cutting fruit into a plurality of slices. The cutter comprises a top plate having a plurality of radially extending blades tapering to a point below the top plate. The fruit to be cut is contained between a support plate having radial slots and a guide plate having radial slots through which the cutter blades pass. The cutter is actuated by an operating handle which forces the cutter blades down toward the guide plate and the fruit along a grooved upright, cutting the fruit into a plurality of slices as the blades pass completely through the fruit. Similar arrangements for coring and cutting fruit are shown in U.S. Pat. Nos. 703,331 of Acree and 2,560,229 of Leavens.

In U.S. Pat. No. 2,836,212 of Shaw there is shown a vegetable cutting apparatus designed primarily for cutting potatoes into slices in which a multi-bladed cutter is carried in a block which is guided by guide posts. The cutter is levered down onto the work piece by a pantograph arm arrangement, and passes completely through the work piece.

A vegetable cutter apparatus for cutting radishes and the like to form, by a series of radial cuts, a simulated appearance of the pistil and petals of a flower is shown in U.S. Pat. No. 2,625,972 of Torres. A multi-bladed cutter having a central annular cutter and a plurality of radial cutters is forced down into the work piece. After cutting, as the cutter is withdrawn, any tendency of the work piece to adhere or cling to the cutter is negated by an ejector mechanism which moves with the cutter until a sliding stop carried by the cutter encounters the frame, which forces the work piece off of the cutter.

Various other arrangements and apparatus for cutting or segmenting fruits and vegetables are shown in U.S. Pat. Nos. 4,569,280 of D'Ambro et al and 4,095,518 of Jones. and in German patent 817351 and Swiss patent 379705.

In none of the foregoing arrangements is the problem addressed of cutting a layered work piece, such as an onion, to form a decorative as well as useful finished product. Such a layered device, which must remain intact for decorative purposes, when cut by cutters that cut from the center axis of the work piece outward, such as in the Hampel, Leavens, Acree and Torres arrangements, is cut more deeply in the center than at the outer periphery of the work piece, which severely limits the extent to which the outer portion of the work piece can be cut without severing the central portion from the outer portion. In the Torres patent, the cutter does not pass completely through the work piece, and the end result is a flower like appearance, but with the radial spread thereof limited because of the failure of the apparatus to cut the outer periphery deeply enough inasmuch as cutting is from the inside out. In the D'Ambro et al. Jones, and Swiss patent, the initial cut is made on the outside of the work piece and cutting is from the outside of the work piece in toward the center, but the blades cut completely through the work piece. If these structures were to be used to cut an onion only partially, i.e., without cutting completely through the onion so that a decorative appearance may be achieved, the depth of cut would have to be arbitrarily determined by the operator. In addition, upon withdrawal of the cutter, the onion would tend to cling to the cutter and would have to be removed by hand. Heretofore, hand cutting of the onion has been relied upon, but such a method is labor intensive and not cost effective, as well as being difficult to accomplish properly, and often results in wastage because of a too deep cut which severs at least portions of the onion.

SUMMARY OF THE INVENTION

The present invention is an apparatus for cutting onions in such a manner that the completed product resembles a large chrysanthemum or marigold. When the onion thus cut is battered and deep fried, and served with an accompanying dip, it makes a delicious and novel appetizer consisting of a multitude of individual strips of fried onion which may be individually pulled off and dipped into a savory dip or sauce.

The apparatus of the present invention, in a preferred embodiment thereof, comprises a frame having a base plate and a pair of spaced vertical side walls, each having a vertically extending slot therein. A top plate is mounted between the two vertical side walls, and a pair of spaced vertical guide rods are mounted to, and extend between, the base plate and the top plate. An apertured blade holding plate is slidably mounted on the guide rods for vertical movement with respect thereto, the blade holding plate being substantially parallel to the top and bottom plates throughout any movement thereof.

A tapered cutter assembly in the form of a hollow cone is formed by a plurality of radial blades, such as, for example, twenty four blades, extending between an apertured ring at the top of the cone and a larger apertured ring at the bottom. The cutter assembly is mounted within the aperture of the blade holding plate at the base of the conic configuration, and extends above that plate. A first actuating lever arm is pivotally mounted at one of its ends to one of said side walls externally thereof, and a second actuating lever arm is pivotally mounted to the other of said side walls. The distal ends of the first and second lever arms extend beyond the walls of the apparatus and are connected by an actuating cross arm.

The blade holder plate has a guide pin mounted on each side which is adapted to ride in the vertical slot of the adjacent wall. The guide pins are each pivotally connected to a crank arm which is in turn pivotally connected to the corresponding lever arm, so that up and down movement of the actuating cross arm produces a corresponding up and down movement of the cutter holder plate and, hence, the cutter assembly.

Mounted on the base plate in axial alignment with the cutter assembly is a work piece support member upon which the work piece, i.e., onion, to be cut rests. The support member has an upper portion in the shape of a truncated cone for providing clearance for the cutter blades as they pass down past the bottom of the work piece. Also mounted on the base plate, on either side of the support member, are a pair of stops which halt the downward movement of the holder plate and thus the cutter assembly. The stops are easily removed and replaced, hence the limits of downward movement can be precisely defined by installing stops of the desired height.

Spring members mounted to the proximal ends of the lever arms act to return the arms and hence the cutter assembly to the upper or load and unload position when the actuating cross arm is released by the operator. In operation, the onion tends to cling to the cutter blades, and thus rises with them. To eject the onion from the blades, an ejector ring having a downwardly extending punch pin concentric therewith is mounted on the underside of the top plate, coaxial with the axis of the cutter assembly. As the cutter assembly is snapped upward by the springs, the punch pin passes through the apertured ring at the top of the cutter assembly and engages the onion, forcing it off of the blades. The ejector ring likewise engages the onion and acts to eject it from the cutter assembly. Because the punch or ejector pin engages a soft portion of the onion, if the onion tightly adheres to the blades, it might not be forced completely off of the blades. The ejector ring, by engaging a greater area of the onion, insures that the onion will be separated from the blades.

The cutter assembly cuts the onion to increasing depth radially outward from the center, so that in the finished cut the depth of the cut is proportional to the radius of cut. The apparatus thereby produces in a reproducible manner a uniformly cut onion in which the extreme lower portion remains uncut, so that no parts of the onion are severed from the onion and a decorative, flower-like appearance is achieved.

The numerous features and advantages of the present invention will be more readily apparent from the following detailed description, read in conjunction with the accompanying drawings.

DETAILED DESCRIPTION

Figure 1:
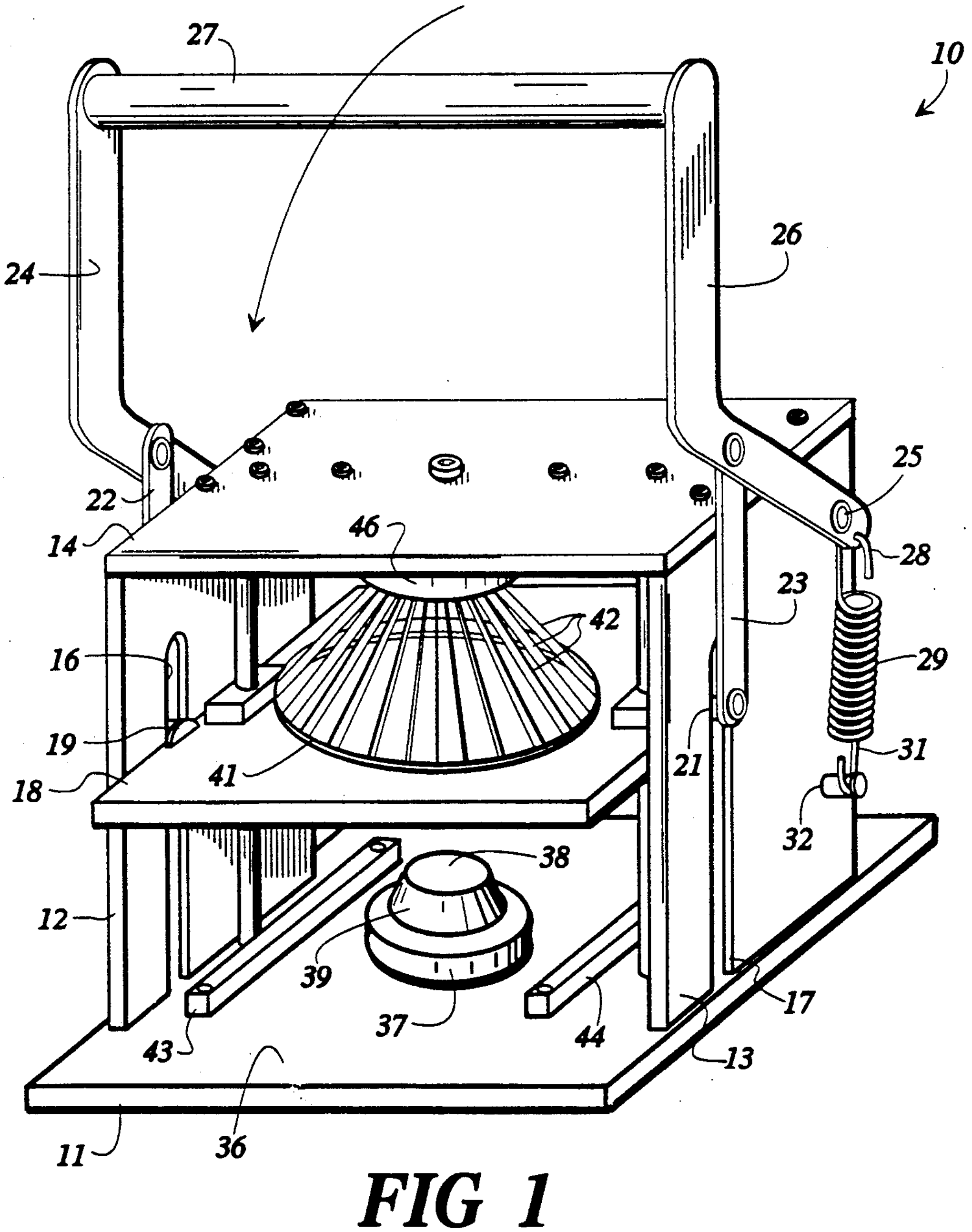
FIG. 1 is a perspective view of the cutter apparatus of the present invention.

In FIG. 1 of the figures, wherein like numerals define like parts throughout the several views, the cutter apparatus 10 comprises a base plate 11 having mounted adjacent one side a first upstanding side wall 12 and, adjacent the other side a second upstanding side wall 13. The upper ends of the side walls 12 and 13 have affixed thereto a horizontally extending top plate 14, thereby forming an open box like structure. Side wall 12 has a vertically extending elongated slot 16 located approximately centrally between the front and rear edges of wall 12, and, in like manner, side wall 13 has a similar elongated slot 17. Located within the box-like structure and adapted to move vertically with respect thereto, as will be discussed more fully hereinafter, is an apertured cutting blade holder plate 18. Affixed to plate 18 at one side thereof is a guide pin 19 adapted to ride in slot 16, and affixed to the other side of plate 18 is a guide pin 21, adapted to ride within slot 17. Pins 19 and 21 are preferably located approximately midway between the front and back edges of plate 18, but this is not strictly necessary, so long as the various components to be discussed are properly aligned.

Figure 2:
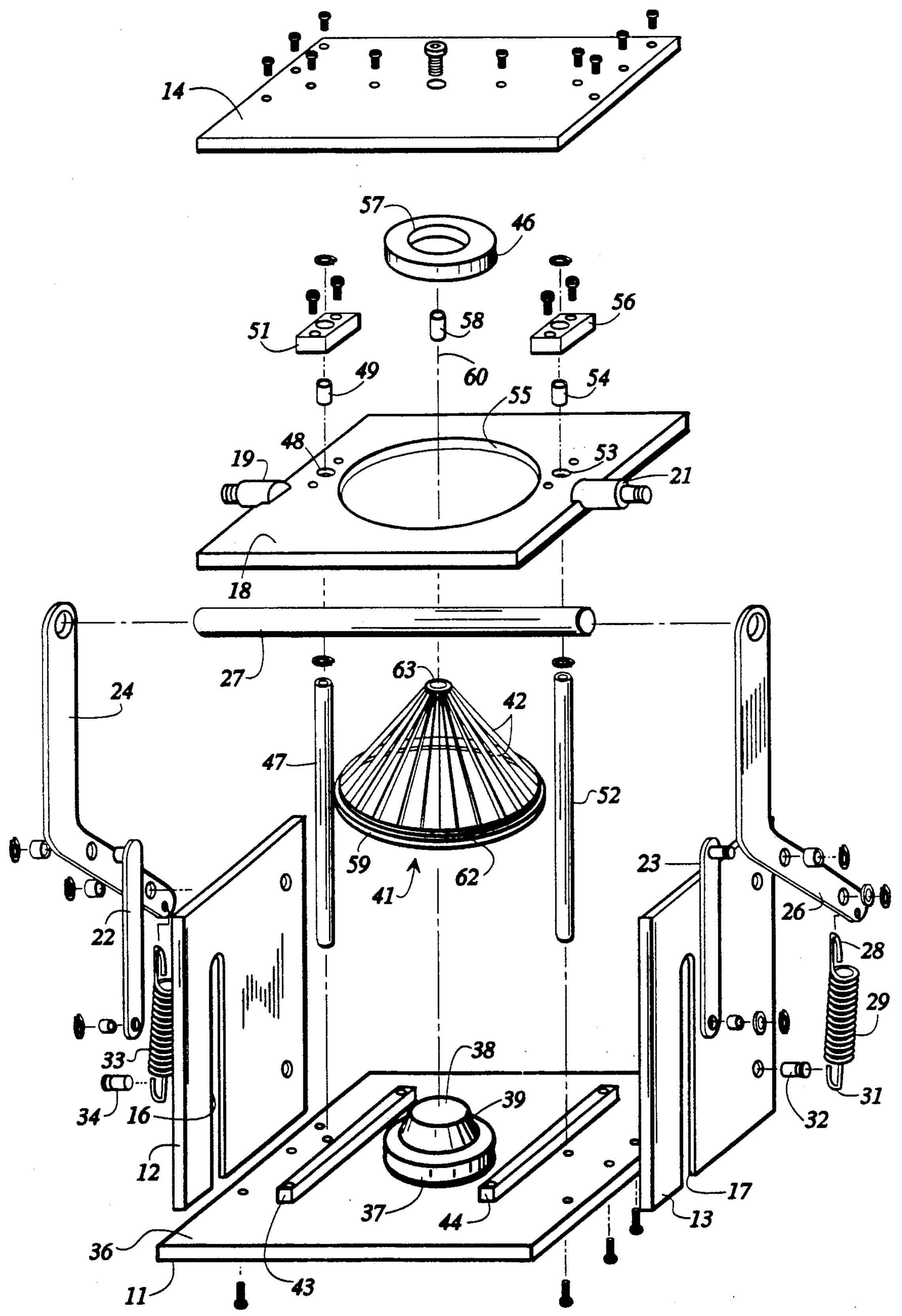
FIG. 2 is an exploded perspective view of the apparatus of FIG. 1.

Pivotally connected at one end to pivot pin 19 is a connecting arm 22, and pivotally connected at one end to pivot pin 21 is a connecting arm 23. The other end of arm 22 is pivotally connected to an actuating lever arm 24 at a point intermediate the ends of arm 24, and, in like manner, the other end of connecting arm 23 is pivotally connected to and actuating lever arm 26 intermediate its ends. Arms 24 and 26 are pivotally connected to side walls 12 and 13 respectively adjacent one of their ends by means of pivot pins 25, only one of which is shown, while the distal ends of arms 24 and 26 are connected by an actuating cross arm 27. The end of arm 26 extends beyond pivot pin 25 and has connected thereto one end 28 of a return spring 29, the other end 31 of which is fixedly connected to side wall 13 by means of a pin 32. Arm 24 is connected at its other end to a spring 33 as seen in FIG. 2 which is fixedly connected to side wall 12 by a pin 34, also as seen in FIG. 2. It can be seen in FIG. 1 that when actuating cross arm 27 is pulled forward and down, as denoted by the arrow, plate 18 is lowered, and when cross arm 27 is released, springs 29 and 33 restore cross arm 27 to its upper position, raising plate 18.

Mounted on the upper surface 36 of base plate 11 is a work piece holder 37 having a slightly concave upper surface 38 and a tapered portion 39. Mounted on blade holder plate 18 is a conical blade assembly 41 having a plurality of blades 42, 42, as will be described more fully hereinafter, the angle of the cone of assembly 41 being the same as the angle of the tapered portion 39 of holder 37. Also mounted on surface 36, on either side of holder 37 is a pair of stop members 43 and 44 which serve to stop the downward movement of plate 18. The height of members 43 and 44 is such that the cutter blades 42 of cutter assembly 41 will cut the work piece to within one-half inch of the bottom for example, without cutting entirely through it as will be discussed more fully hereinafter. Mounted on the underside or lower surface of plate 14 is an ejector ring 46 which likewise will be discussed more fully hereinafter. The apparatus 10 may be mounted on a support, such as a table, or may have supporting feet or suction cups on the underside of plate 11.

FIG. 2 is an exploded view of the apparatus of FIG. 1. As can be seen in FIG. 2, a first vertical guide rod 47 is mounted on base plate 11 and extends upward through a hole 48 in plate 18, a bushing 49 of suitable material, such as nylon carried in a bushing holder 51 which is affixed to the top surface of plate 18, and is fixedly attached to plate 14. In like manner, a second vertical guide rod 52 fixedly mounted to plate 11, extends upward through a hole 53, bushing 54 which is contained in bushing holder 56, and is affixed to plate 14. Guide rods 47 and 52 function to insure that blade holder plate 18 remains parallel to base plate 11 during its upward and downward movements. Blade holder plate 18 also has an aperture 55 therein which is centered along axis 60 and in which blade assembly 41 is mounted.

Ejector ring 46, which may be of any suitable material, such as nylon, has a central bore 57 therein through which extends an ejector pin or punch 58, which is affixed at one end to the underside of top plate 14. The distal end of pin 58 extends downward beyond ring 46, and it may be of any suitable material, such as a high grade stainless steel suitable for use in processing food. It is to be understood that all of the parts of the apparatus are made of materials suitable for such use. Thus holder 37 and ring 46 may be made of easily cleanable nylon, as may stops 43 and 44, while blades 42, 42 and pin 58 are preferably made of high quality stainless steel. The remaining parts are preferably made of stainless steel also, except the bushings 49 and 54, and bushing holders 51 and 56, which preferably are of nylon or other suitable bushing material. Central bore 57 of ring 46 is of a diameter sufficient to receive a portion of the conical blade assembly in its upper position, and thus ring 46 acts as a stop against further upward movement of cutter blade assembly 41, the blades 42, 42 bearing against ring 46.

Figure 3A:
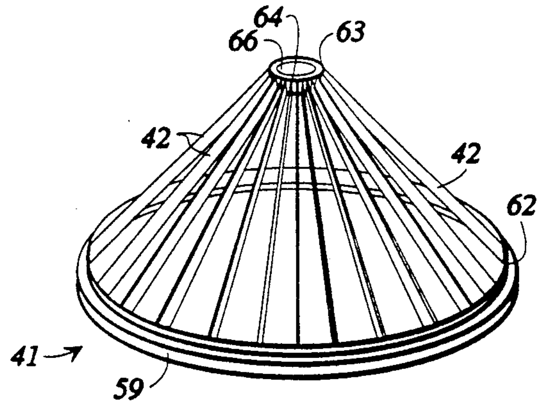
FIGS. 3A through 3D are detail views of the cutter blade assembly for the apparatus of FIG. 1; and, FIG. 4 is a partial sectional elevational view of the apparatus of FIGS. 1, 2, and 3A through 3D illustrating the onion cutting operation.
Figure 3B:
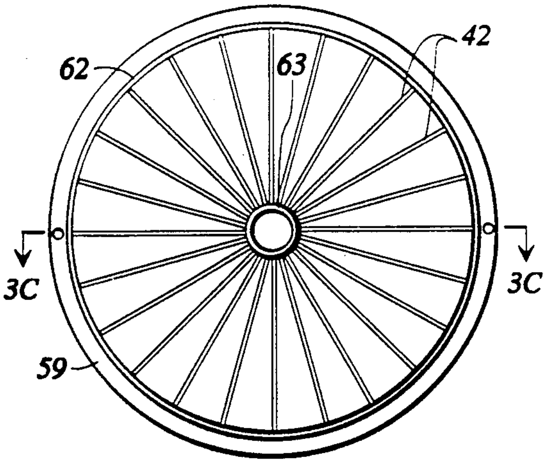
Figure 3D:
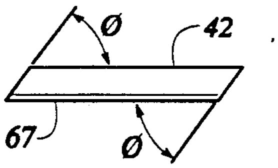
Figure 3C:
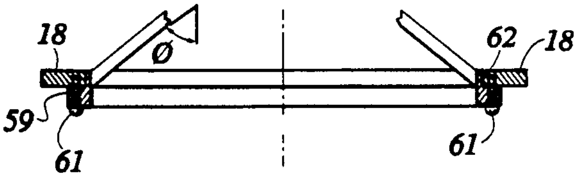

In FIGS. 3A through 3D the details of the conical blade assembly 41 are shown. As seen in FIG. 3A, assembly 41 comprises a mounting ring 59 for mounting the assembly 41 within aperture 55 and which is affixed to plate 18 by suitable means, such as screws 61, 61 as seen in FIG. 3C. Fixedly attached to ring 59 is a blade holding ring 62 to which are affixed, as by welding, a plurality of radial blades 42, 42 extending inwardly and upwardly, and which terminate in a second, smaller holding ring 63, to which they are affixed. Both rings 59 and 62 may have, for example, an inner diameter of seven inches. In FIG. 2 and 3A ring 63 is shown having a plurality of vertical slots 64, 64 extending around the periphery thereof in which the ends of the blades 42 may be inserted as an aid in properly locating and spacing the blades. Holding ring 63 has a central bore 66 which is of sufficient diameter to allow passage of ejecting pin 58 therethrough, without interference. As can be seen in FIGS. 3A and 3D, the orientation of the blades 42, 42 forms a truncated cone shape for the blade assembly 41 at an angle $\phi$ to the vertical. Inasmuch as ring 63 is supported by the cutting blades 42, 42, it is preferable to cut the ends of each blade 42 at an angle $\phi$ to the cutting edge 67 and to the top edge, as shown in FIG. 3D, thereby insuring a truncated cone structure having an included angle equal to $2\phi$.

In operation, arms 24 and 26 are held in an upright position by springs 29 and 33, with plate 18 and cutter assembly 41 at their upper limit of travel, in which cutter assembly 41 rides in bore 57 of ring 46 and is blocked thereby from further upward movement.

Figure 4:
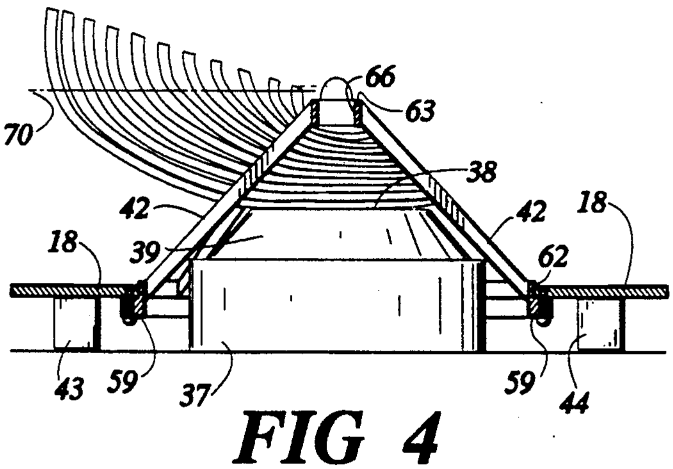

An onion to be cut, which has preferably has been skinned and has had its stem portion removed, is placed on surface 38 of holder 37 and rests thereon. The operator then pulls actuating cross arm 27 down in the direction of the arrow in FIG. 1, thereby lowering plate 18 with cutter assembly 41 down, bringing blades 42, 42 into contact with the outer periphery of the onion. Continued downward movement of arm 27 and hence cutter assembly 41 first brings the blades into contact with the outer portion of the onion, and then with the inner portion, as best seen in FIG. 4. Thus along a horizontal line, such as line 70 in FIG. 4, cutting proceeds sequentially from left to right as viewed in FIG. 4. As a consequence, when plate 18 encounters stops 43 and 44 the onion has been cut in all but a small conic section, as shown in FIG. 4, but no part of the onion has been completely severed. Inasmuch as the onion is layered, the end result is a plurality of fingers of substantially square or rectangular cross section radiating outward from the bottom central portion of the onion, resembling nothing so much as a chrysanthemum in full bloom.

As can be seen in FIG. 4, the tapered portion 39 of holder 37 provides clearance for the blades 42, thus insuring cutting of the onion regardless of the height of stop members 43 and 44. As was pointed out heretofore, the height of stop members 43 and 44 can be chosen to optimize the depth of the cuts made in the onion.

After the stage depicted in FIG. 4 has been reached, the operator either raises arm 27 or releases it whereupon springs 29 and 33 raise it, lifting plate 18 and cutter assembly 41. It is often the case that the onion will adhere or cling to the cutter assembly and be raised along with it. When this occurs, ejector pin 58 and ejector ring 46 are engaged by the upwardly moving onion and force it off of the cutter assembly 41, ejector pin 58 engaging the onion internally of the cutter blade assembly and ring 46 engaging the onion externally of the cutter blade assembly.

After the onion has been cut, it may be dipped in batter and deep fried, which results in an attractive "finger food" serving as an appetizer, for example.

While the principles of the invention and the features thereof have been shown in an apparatus for cutting onions or other layered foods, it can be appreciated that these same principles can be applied to the cutting of other foods as well.

The foregoing description illustrates the principles and features of the invention in one preferred embodiment thereof. Numerous variations or changes may occur to workers in the art without departure from the spirit and scope of the invention.

We claim:

1. An apparatus for cutting a work piece having an outer periphery and a center portion into a plurality of elongated pieces attached to the work piece and radially disposed about the center of the work piece comprising
   a frame,
   support means mounted on said frame for holding the work piece,
   a cutter assembly having cutting blades for cutting the work piece, said cutting blades being configured to cut the work piece progressively from the outside periphery thereof toward the center portion, said cutter assembly having a first centrally located cutting blade holding ring having an outer diameter and an inner diameter,
   means for moving said cutter assembly along an axis in a cutting direction to bear against the work piece and to cut through a portion of the work piece to produce a deeper cut in the cutting direction in the work piece at the outer periphery thereof than at the center portion,
   stop means for halting the movement of said cutter assembly in said cutting direction prior to the work piece being severed into a plurality of individual independent pieces, and means for separating said cutter assembly from the work piece comprising means for moving said cutter assembly in a direction opposite to said cutting direction, first elongated ejector means mounted on said frame and coaxial with said cutter assembly, said first ejector means being adapted to pass through said first cutting blade holding ring to contact the work piece internally of the cutter assembly when the work piece is moved in the direction opposite to said cutting direction by the cutter assembly, and second ejector means mounted on said frame coaxial with said first ejector means for contacting the work piece externally of the cutter assembly when the work piece is moved in the direction opposite to said cutting direction by the cutter assembly.

2. An apparatus as claimed in claim 1 wherein said frame comprising a plate member having top and bottom surfaces, and said first ejector means comprises a pin having an outside diameter mounted on the bottom surface of said plate member, the outside diameter of said pin being less than the inside diameter of said first blade holding ring.

3. An apparatus as claimed in claim 1 wherein said second ejector means comprises an ejector ring having a bore therein adapted to receive at least a portion of said cutter assembly.

4. An apparatus as claimed in claim 3 wherein said cutting blades are arrayed to form a hollow truncated cone extending between said first blade holding ring and a second blade holding ring spaced from said first blade holding ring and having an outside diameter and an inner diameter greater than the inner diameter of said first blade holding ring.

5. An apparatus as claimed in claim 4 wherein the diameter of said bore is greater than the outside diameter of said first blade holding ring and less than the outside diameter of said second blade holding ring.

6. An apparatus as claimed in claim 5 wherein said frame comprises a plate member having top and bottom surfaces and said second ejector means is mounted on said bottom surface.

7. An apparatus as claimed in claim 6 wherein said first ejector means comprises a pin member mounted on said bottom surface and extending through said bore.

* * * * *